United States Statutory Invention Registration [19]

Design [11] Reg. Number: H803

Sherrington [43] Published: Aug. 7, 1990

[54] CAP FOR BOTTLE

[76] Inventor: Mark Sherrington, 64 Waldemar Avenue Mansions, Colehill Lane, Fulham, London, England

[21] Appl. No.: 323,085

[22] Filed: Mar. 14, 1989

Related U.S. Application Data

[63] Continuation of Ser. No. 603,880, Apr. 26, 1984, abandoned.

[52] U.S. Cl. ..... 809/435; D9/453

[58] Field of Search ..... D9/435, 452, 454, 443, D9/377, 434, 453; 215/316, 317, 353

[56] References Cited

U.S. PATENT DOCUMENTS

| | | | |
|---|---|---|---|
| D. 162,894 | 4/1951 | Soffer | D9/443 |
| D. 192,456 | 3/1962 | Neupert | D9/453 |
| D. 209,104 | 10/1967 | Harris et al. | D9/453 |
| D. 223,142 | 3/1972 | Koenigsberg | D9/377 |
| D. 233,507 | 11/1974 | Stevens, Jr. | D9/453 |
| D. 243,158 | 1/1977 | Bolwell | D9/434 X |
| D. 276,138 | 10/1984 | Sebire | D9/413 X |
| D. 280,492 | 9/1985 | Greaves et al. | D9/453 |
| D. 284,555 | 7/1986 | Schornagel | D9/453 |
| 2,573,111 | 10/1951 | Rossi et al. | 215/317 |
| 3,191,789 | 6/1965 | Davidson | 215/353 X |
| 3,376,991 | 4/1968 | Deaver | D9/454 X |
| 3,441,162 | 4/1969 | Julius | 215/353 X |

OTHER PUBLICATIONS

Registered Design No. 991,644 to Unilever Limited; registered 29th Sep. 1979, registration issued 20 Dec. 1979.

*Primary Examiner*—Charles T. Jordan
*Assistant Examiner*—Michael Carone

[57] CLAIM

The ornamental design for a cap for bottle, substantially as shown.

DESCRIPTION

Figure 1:
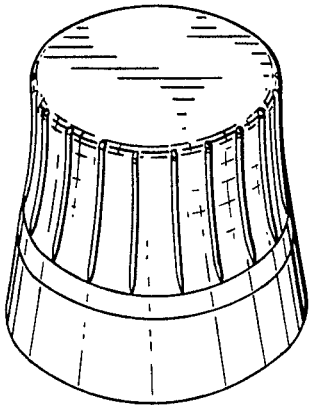
Figure 2:
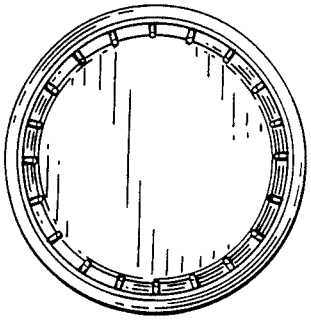
Figure 3:
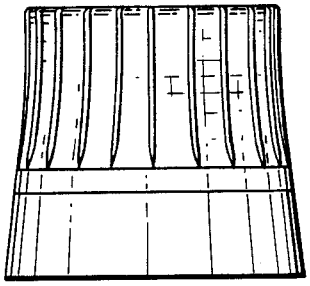
Figure 4:
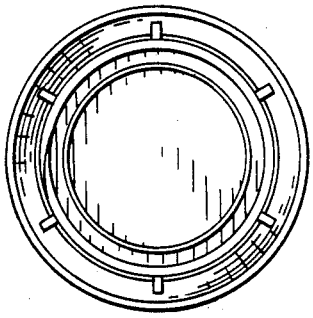

FIG. 1 is a top perspective view of a cap for bottle, showing my new design;
FIG. 2 is a top plan view thereof;
FIG. 3 is a side elevational view thereof; and
FIG. 4 is a bottle plan view thereof.

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.